No. 657,430. Patented Sept. 4, 1900.
H. P. MAXIM.
RUNNING FRAME FOR VEHICLES.
(Application filed Jan. 20, 1900.)

(No Model.)

Attest:
A. N. Jesbera.
E. C. Steckler.

Inventor:
Hiram Percy Maxim
by Redding, Kiddle & Greeley
Attys.

THE NORRIS PETERS CO., PHOTO-LITHO., WASHINGTON, D. C.

UNITED STATES PATENT OFFICE.

HIRAM PERCY MAXIM, OF HARTFORD, CONNECTICUT, ASSIGNOR TO THE ELECTRIC VEHICLE COMPANY, OF JERSEY CITY, NEW JERSEY, AND NEW YORK, N. Y.

RUNNING-FRAME FOR VEHICLES.

SPECIFICATION forming part of Letters Patent No. 657,430, dated September 4, 1900.

Application filed January 20, 1900. Serial No. 2,099. (No model.)

*To all whom it may concern:*

Be it known that I, HIRAM PERCY MAXIM, a citizen of the United States, residing in Hartford, county of Hartford, State of Connecticut, have invented certain new and useful Improvements in Running-Frames for Vehicles, of which the following is a specification, reference being had to the accompanying drawings, forming a part hereof.

This invention relates to running-frames of the general character of that shown in Harold B. Atkins's application for Letters Patent of the United States, Serial No. 737,274, filed November 17, 1899, and has for its object to provide certain novel features of construction for running-frames which embody the invention covered by said application—to wit, the hinging together of the parts of the frame on a diagonal line. These features will be more fully described hereinafter with reference to the accompanying drawings, in which is illustrated a frame which embodies such features in convenient and practical form.

Figure 1:
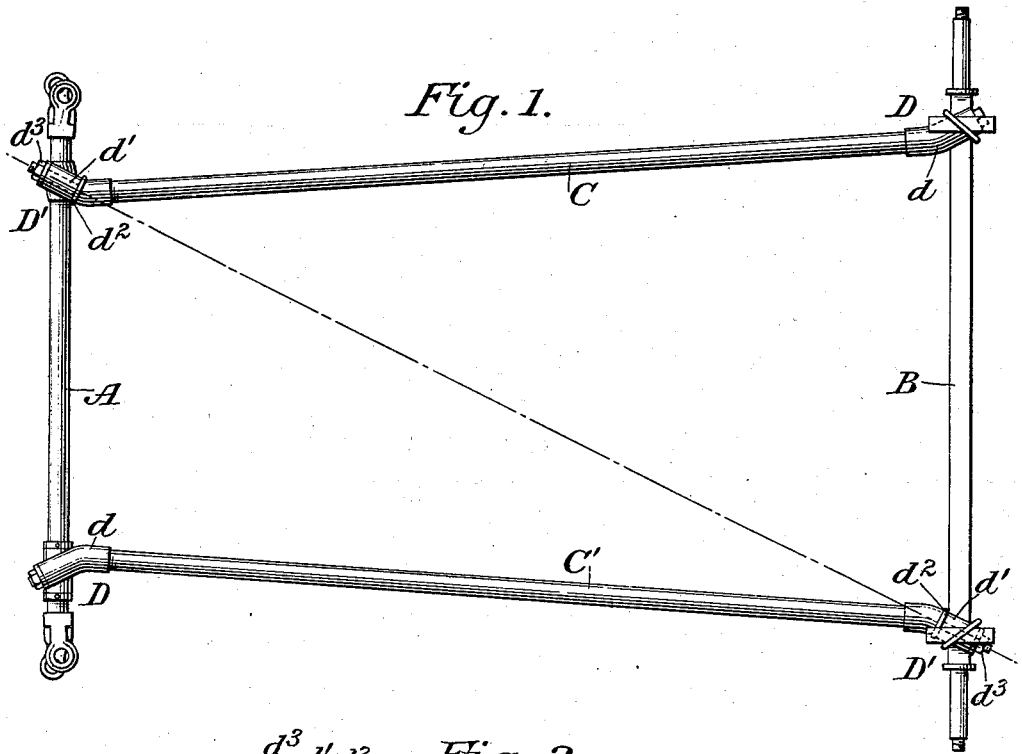
Figure 2:
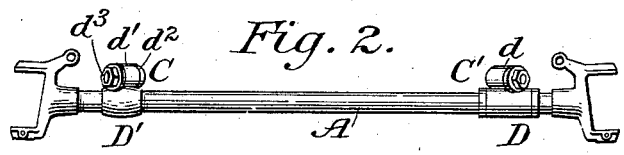
Figure 3:
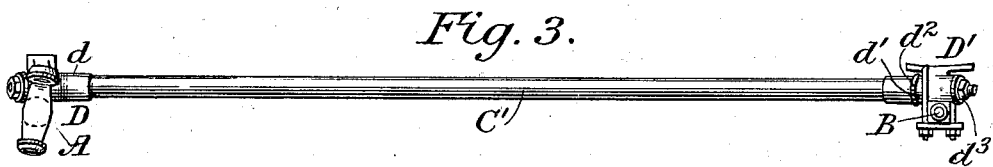

In the drawings, Figure 1 is a plan view of such a frame, and Figs. 2 and 3 are respectively a front elevation and a side elevation of the frame shown in Fig. 1.

The frame shown in the drawings comprises front and rear transverse members A and B and longitudinal members or reaches C and C', all of such members being by preference substantially straight, except as hereinafter indicated. In the form of frame shown in the drawings the front transverse member A is provided with yokes to receive the stub-axles of the steering-wheels, and the rear axle B is provided with journals to receive the rear wheels. The longitudinal members or reaches and the transverse members overlap at each end, and at the points of intersection or overlapping each transverse member has secured to it a coupling D or D'. Each coupling D is provided with a socket $d$ to receive the end of the corresponding longitudinal member or reach, the joint between the coupling D and the end of the corresponding longitudinal member being rigid. Each coupling D may be rigidly secured to the corresponding transverse member or, if desired, the front coupling D may be loose upon the front transverse member, as indicated in Figs. 1 and 2. Each of the diagonally-opposite couplings D' is provided with a socket $d'$, which receives loosely the end of the corresponding longitudinal member or reach, the axes of such sockets being in the same diagonal line, so that the two opposite parts of the frame, each comprising one longitudinal member and one transverse member, shall have a free hinge or folding movement upon such diagonal line, whereby the four wheels of the vehicle are permitted to accommodate themselves to an uneven surface. The ends of the longitudinal members may be crooked, so as to lie in the axis of the diagonal hinge-joint, such ends being provided with shoulders $d^2$ and caps or nuts $d^3$ to prevent displacement while permitting free rotary movement. It will be obvious that other forms of couplings might be used at D and that other forms of hinged joints might be substituted for those shown at D', provided such hinged joint is located at the point of intersection or overlapping of the transverse and longitudinal members.

It will be seen that not only does the overlapping of the longitudinal and transverse members make it possible to use a very simple coupling which will hold the parts together with maximum strength and cheapness of construction, but that by arranging the diagonally-hinged joints at the points of intersection or overlapping there is absolutely no tendency to twist the connection of the members of the frame at the other corners and no interference with the freedom of the frame to fold or hinge on the diagonal line as the inequalities of the surface upon which the four wheels rest may require. The employment of longitudinal members or reaches which are straight from joint to joint makes it possible to dispense with cross members or corner-braces which might have to be inserted in order to accommodate unbalanced strains due to bending of such members.

It will be obvious that the invention is not to be restricted to the precise form and construction of parts shown and described herein.

I claim as my invention—

1. A running-frame for vehicles comprising overlapping transverse and longitudinal members and couplings joining the transverse and longitudinal members at the points of overlapping, the frame being composed of two parts hinged together on a diagonal line.

2. A running-frame for vehicles comprising overlapping transverse and longitudinal members and couplings joining the transverse and longitudinal members at the points of overlapping, each of two diagonally-opposite couplings having a socket with its axis in a diagonal line common to both, the end of the corresponding longitudinal member entering said socket loosely, whereby said frame is hinged on said diagonal line.

3. A running-frame for vehicles comprising overlapping transverse and longitudinal members and couplings joining the transverse and longitudinal members at the points of overlapping, each of two diagonally-opposite couplings having a socket with its axis in a diagonal line common to both, the end of the corresponding longitudinal member being crooked to lie in the same diagonal line and to enter the socket loosely, whereby said frame is hinged on said diagonal line.

4. A running-frame for vehicles comprising transverse and longitudinal members and couplings joining the transverse and longitudinal members, the longitudinal members being straight from joint to joint and the frame being hinged on a line from one joint to a diagonally-opposite joint.

This specification signed and witnessed this 12th day of January, A. D. 1900.

HIRAM PERCY MAXIM.

In presence of—
G. HERBERT CONDICT,
HERMANN F. CUNTZ.